(No Model.)
J. W. H. CAMPBELL.
FOOD PRODUCT AND APPARATUS.
No. 522,822. Patented July 10, 1894.
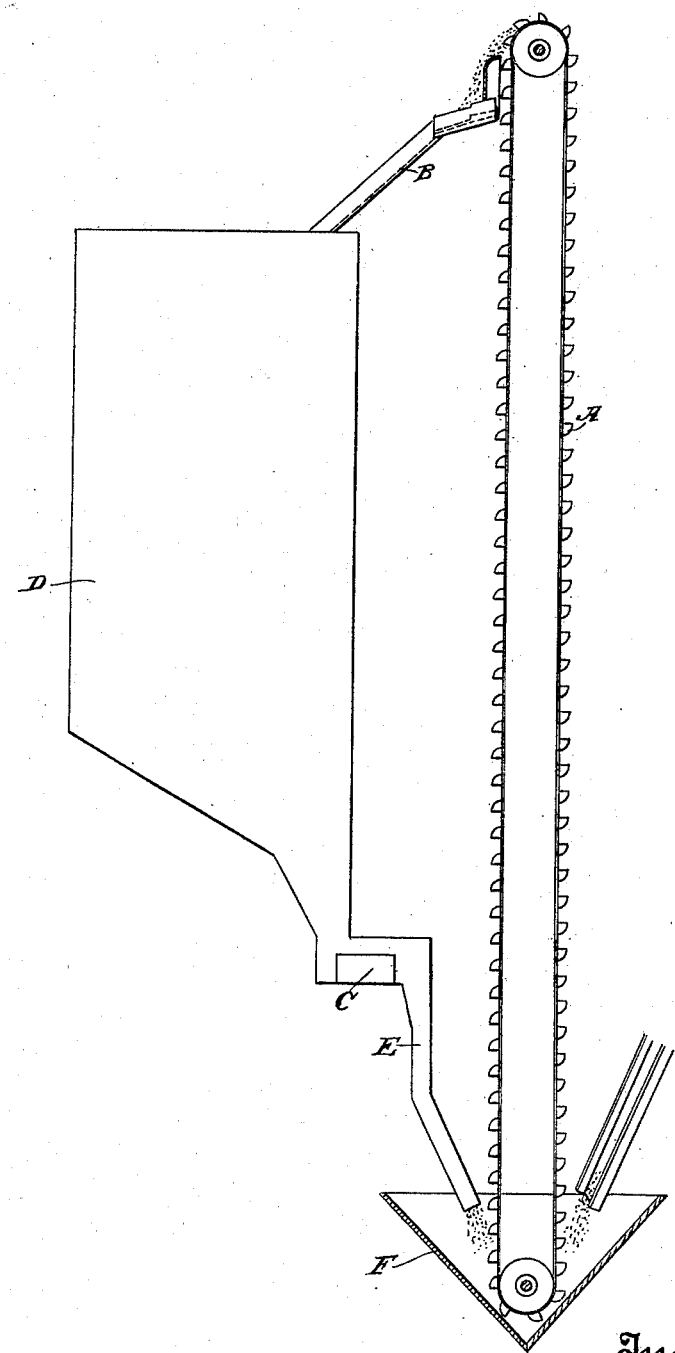
Witnesses,
Inventor
James W. H. Campbell
By Dewey & Co
Atty

United States Patent Office.

JAMES W. H. CAMPBELL, OF SAN FRANCISCO, CALIFORNIA.

FOOD PRODUCT AND APPARATUS.

SPECIFICATION forming part of Letters Patent No. 522,822, dated July 10, 1894.

Application filed September 5, 1893. Serial No. 484,860. (No model.)

*To all whom it may concern:*

Be it known that I, JAMES W. H. CAMPBELL, a citizen of the United States, residing in the city and county of San Francisco, State of California, have invented an Improvement in Food Products and Apparatus; and I hereby declare the following to be a full, clear, and exact description of the same.

My invention relates to a certain improvement in food products, and it consists of the process of preparing grain as a food product and in the constructions and combinations of devices constituting an apparatus for carrying out the same, as I shall hereinafter fully describe and claim.

In the accompanying drawing—the figure is a general view of my apparatus.

In carrying out my invention I take corn, barley, and rye in equal portions. The whole grain is first elevated by an elevator A about sixty or seventy feet, and is delivered from the top of the elevator upon an inclined directing chute B, which delivers it so as to fall through the air freely and into a receiving bin or hopper. After this operation the grain is run through a purifier C of any suitable form, and is again elevated and discharged through the air, and falls into a receiving bin or hopper D. From this hopper it is led through a chute E into the receiver or hopper F from which it is raised by the elevator A to be again discharged. From another receptacle the corn is led by a similar chute into the hopper F, and from this the barley and corn thus mixed is elevated and discharged through the air, and the same process gone through, including the cleaning. These mixed grains are then delivered into the hopper F and the rye is then added, and the whole body of the grain is again elevated and discharged through the atmosphere in the same manner as at first described. After these various operations have been completed the mixed grain is ground to a sufficient degree of fineness, and is then in condition to be made up into bread or other products for consumption.

The essential feature of novelty in this case lies in discharging the different grains, separately and afterward mixed, from a great height so that the grains fall through the air for a long distance and fall with a shock into the receiving bin, this being, it is alleged, the cause of the production of additional phosphoric acid in the grains, and also of the destruction of any fungus life or growth which the grain may contain and which would be injurious to it.

The action of the air upon the grain appears to add a considerable amount of phosphoric acid to that already contained in the grain, at least the result of many careful analyses of the separate grains before and after this process has shown this to be a fact, and the repeated passages through the air and the cleaner or purifier, thoroughly mixes and cleans the grain.

Having thus described my invention, what I claim as new, and desire to secure by Letters Patent, is—

1. A process of preparing grain as a food product consisting in elevating equal parts of corn, barley and rye, and dropping them through the air into receiving bins, passing the grains through a purifier and again elevating and discharging them through the air, and mixing the different grains together and repeating the process one or more times, substantially as herein described.

2. An apparatus for preparing grain before grinding consisting of an elevator by which the grain is raised and discharged from a height, a receiving bin into which the grain falls at the bottom, a chute through which it is carried, and a hopper at the foot of the elevator into which the grains are successively delivered, and from which they are raised by the elevator, substantially as herein described.

In witness whereof I have hereunto set my hand.

JAMES W. H. CAMPBELL.

Witnesses:
S. H. NOURSE,
H. F. ASCHECK.